Sept. 2, 1958        F. B. CROWLEY        2,849,945
MARGINAL SHELF FOR A HOUSEHOLD ROASTER
Filed Jan. 21, 1954                       2 Sheets-Sheet 1
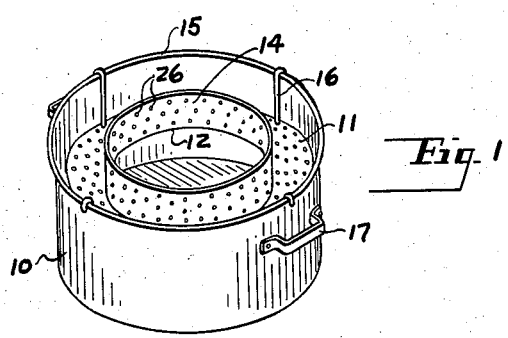
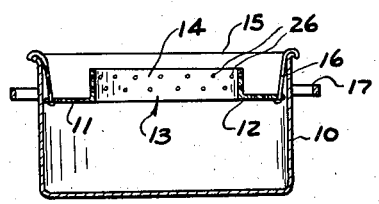 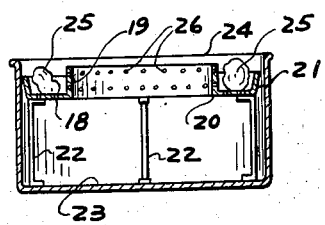
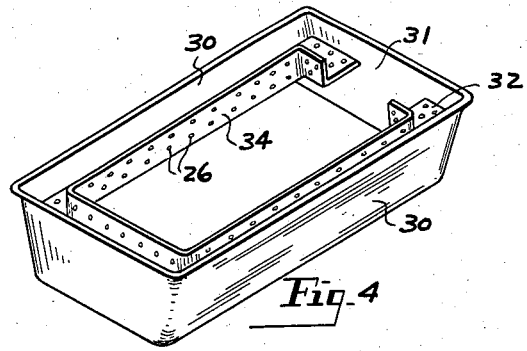 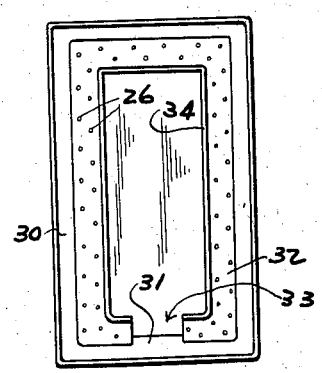
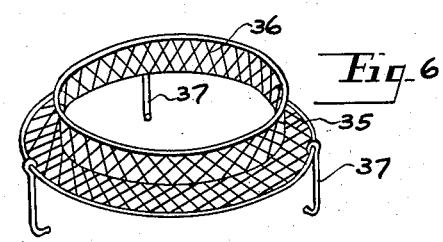
INVENTOR.
FRANCIS B. CROWLEY.
BY Louis Chayka
ATTORNEY.

Sept. 2, 1958　　　　F. B. CROWLEY　　　　2,849,945
MARGINAL SHELF FOR A HOUSEHOLD ROASTER
Filed Jan. 21, 1954　　　　　　　　　　　　2 Sheets-Sheet 2

INVENTOR.
FRANCIS B. CROWLEY.
BY Louis Chayka
ATTORNEY

United States Patent Office 2,849,945
Patented Sept. 2, 1958

2,849,945

MARGINAL SHELF FOR A HOUSEHOLD ROASTER

Francis B. Crowley, Detroit, Mich.

Application January 21, 1954, Serial No. 405,285

1 Claim. (Cl. 99—339)

My invention pertains to kitchen vessels of the type generally used for cooking meats, some of the vessels, especially when equipped with deep, container-like covers, being commonly known as roasters.

The object of the invention is to provide means whereby vegetables or other articles of food may be cooked in the roaster while disposed along the edges thereof and close to its top, without obstructing access to the food, such as meat, which may be the principal object to be cooked and which may occupy the full volume of space within said roaster with the exception of the space occupied by my said marginal shelf.

The purpose of the invention will be readily understood in the light of the following explanation:

In cooking meats in the roaster, it is a common practice to place within the roaster various vegetables, such as potatoes. The practice is desirable for the sake of improving the flavor of the vegetables by exposing them to the vapors of the cooked and seasoned meats, and partly for the sake of eliminating the need of additional dishes or other containers for the cooking of said vegetables. However, the practice of cooking the meats and the vegetables in the roaster at the same time also has its disadvantages. In the first place, the space at the bottom of the roaster is ordinarily limited, and, in the second place, a sufficient quantity of a gravy composed of the juices of the cooked meat, water, fats, and seasoning must be allowed to accumulate in the roaster for best cooking results. The gravy is customarily used for basting, which means that the gravy accumulated at the bottom of the roaster has to be withdrawn and poured over the top portions of the meat to prevent its drying out. However, vegetables placed within the gravy will absorb it to the extent that little or nothing will be left for basting, while they themselves will become soggy.

It is in order to overcome these disadvantages that I have developed my marginal shelf, or marginal means of support of food items to be cooked in roasters or similar vessels for cooking food.

A further object of my invention is to make the shelf removable, light in weight, and to provide it with means for its suspension from the rim portion of the vessel in which it is to be used, or with means of support from below.

Finally, my object is to produce a shelf of simple construction and one which may be produced at a low cost.

I shall now describe my marginal food-supporting means with reference to the accompanying drawings in which:

Fig. 1 is a perspective view of a roaster, with a perspective view of my shelf in its operative position therewithin;

Fig. 2 is a vertical sectional view of the same roaster and the utensil shelf shown in Fig. 1;

Fig. 3 is a vertical sectional view of a roaster with a modified food-supporting means in its operative position therein;

Fig. 4 is a perspective view of a different species of a roaster with a modified marginal food-supporting shelf disposed therein;

Fig. 5 is a top elevational view of the roaster shown in Fig. 4;

Fig. 6 is a perspective view of another species of the marginal shelf described herein.

Similar numerals refer to similar parts throughout the several views.

Figure 7:
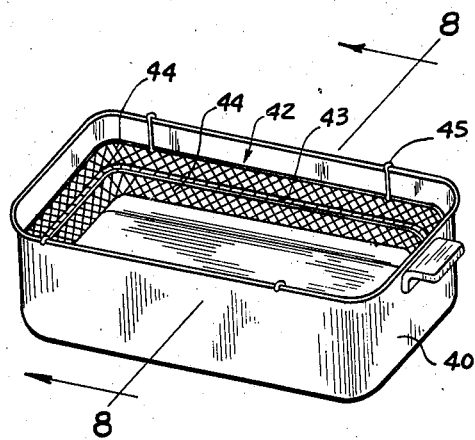
Fig. 7 is a perspective view of a roaster with a modified food-containing trough therein.

The roaster shown in Fig. 1 and identified by numeral 10 is of a conventional cylindrical type, open at the top but adapted to receive a cover which at times may have the shape of an inverted container, fitting from above over the top rim portion of said roaster. As the cover alone forms no part of my inventive concept, I have not included it in the drawings.

The marginal shelf or marginal holder shown in Fig. 1 consists of a narrow, circular platform or ledge 11 disposed within the roaster in a horizontal position at a level spaced from the upper rim 15 thereof. The inner edge of the shelf defines a circular opening 13, and skirting said opening is a vertical flange 14 which may form an integral part of said shelf. Both the shelf and the flange are preferably made of sheet metal provided with a plurality of openings or perforations. If preferred, either the shelf or the flange, or both, may be made of wire mesh or wire screen, as shown in Fig. 6. The object is to allow heat and vapors rising from the lower part of the roaster to reach from below any food articles, such as vegetables, resting on said shelf. As a means of keeping the shelf at the desired level within the roaster, I have provided the shelf with hooks 16, said hooks being secured at the lower end to the shelf and being adapted to be applied at the top to the aforesaid rim 15, as shown in Figs. 1 and 2.

To conclude the description of the roaster shown in Fig. 1, I wish to add that numeral 17 indicates handles by which the roaster may be lifted.

In Fig. 3 the vegetable-supporting member is somewhat different, as here it has the form of an annular trough including a flat bottom 18, an annular flange 19 at the inner rim 20 thereof, and a circular flange 21 along the outer rim of said bottom, the two flanges forming opposed walls of the trough.) Here, in order to eliminate suspension hooks, analogous to hooks 16 in Figs. 1 and 2, I have supplied the trough with legs 22 which, welded or otherwise affixed to the under portion of the trough, rest at the lower ends upon bottom 23 of the roaster. The advantage of this construction lies in the fact that there are no hooks associated with the upper rim 24 of the roaster to interfere with the application of a cover therefor.

The advantage in having the vegetable-supporting means made in the shape of a trough lies in the fact that the trough, with its contents, may be removed from the roaster without the danger that said contents may slip off in the process, as might be the case if the contents were resting on a flangeless shelf. For an illustration of the contents within the trough, I am showing objects marked 25 which will indicate potatoes.

As the roasters come in different forms, I am showing a rectangular type thereof in Fig. 4. It will be noted that the side walls 30 of the roaster, and the end walls 31, slant inwardly so that the internal dimensions of the roaster taper gradually in a downward direction. Such being the case, the shelf 32, which is substantially rectangular, does not need any hooks for suspension or any legs for support from below, as the shelf will be sustained at a level where the dimensions of said rectangular shelf will be equal to the internal dimensions of the roaster.

The shelf is open at one end, as shown at 33, to afford access to the bottom of the roaster for removal of gravy, while the central part of the roaster may be occupied by meats cooked therein. It will be also noted that the shelf is provided with an upright flange 34 along its inner rim so that vegetables or other food items placed upon the shelf will be retained between said flange and the respective wall of the roaster.

All the shelves and flanges shown in the drawings described up to this point were made of sheet metal provided with a plurality of holes 26. This, as already stated, is simply a matter of choice, as said shelves alone or the shelves and the flanges associated therewith may be made of wire, as shown in Fig. 6 where the shelf is marked 35, the circular flange about the inner rim of the shelf is marked 36, and a plurality of supporting legs is marked 37.

Figure 8:
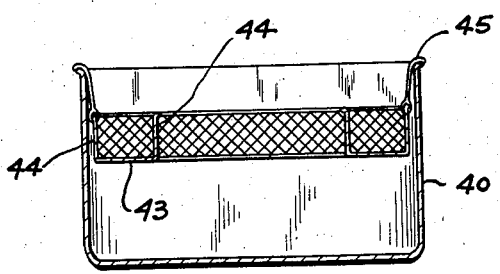
Fig. 8 is a sectional view on line 8—8 of Fig. 7.

A screen type of a food container is also disclosed in the roaster shown in Figs. 7 and 8. The container, made in the shape of a trough, generally identified by numeral 42, is suspended from the upper rim of the roaster by means of hooks 45, and occupies within the roaster the space along the inner wall thereof, leaving the central portion of the roaster open at the top so that the interior of the roaster is always open for inspection from the top and may be reached at any time. The trough, which is made of screen or mesh stock, includes a bottom 43 and two upwardly-extending flanges or walls 44 rising from the rim portions of the bottom in a substantially parallel or slightly diverging relation to each other. This type of the trough has that desirable feature that food may be carried in said trough without the danger of having it slip off the bottom.

It will be understood that the shelf is not confined to any particular shape and that a number of small changes in its structure may be made without departing from the inventive concept disclosed herein.

What I, therefore, wish to claim is as follows:

In combination with a main food cooking vessel open at the top thereof and having a horizontally disposed bottom wall and a vertical side wall whose upper edge defines a rim, a supplemental food supporting means removably disposed within the vessel at a level below the rim and at a distance above said bottom wall, said supplemental food supporting means comprising a horizontal shelf having an enlarged central opening, permitting access to and inspection of the food in the bottom of the main cooking vessel, an upstanding wall extending around the enlarged central opening, the upper edge of the upstanding wall being in a plane below the plane of the rim, said shelf and the upstanding wall being provided with a plurality of holes in permit the vapors from the food being cooked in the main food cooking vessel to permeate the food on the supplemental shelf, and suspension hooks extending upwardly from the outer edge portion of the supplemental food supporting shelf for detachable engagement with the rim of the main food cooking vessel.

References Cited in the file of this patent

UNITED STATES PATENTS

| | | |
|---|---|---|
| 57,244 | Bacon | Aug. 14, 1866 |
| 84,194 | Kasson | Nov. 17, 1868 |
| 109,152 | Still | Nov. 8, 1870 |
| 211,076 | Follett | Dec. 17, 1878 |
| 269,697 | Munn | Dec. 26, 1882 |
| 288,640 | Jackson | Nov. 20, 1883 |
| 374,755 | Reed | Dec. 13, 1887 |
| 656,684 | Wiley | Aug. 28, 1900 |
| 780,851 | Wilson | Jan. 24, 1905 |
| 816,892 | Wasley | Apr. 3, 1906 |
| 1,454,856 | Obrien | May 15, 1923 |
| 1,998,920 | Bremer | Apr. 23, 1935 |
| 2,001,615 | Karten | May 14, 1935 |
| 2,159,578 | Weinman | May 23, 1939 |
| 2,467,337 | Schnell | Apr. 12, 1949 |

FOREIGN PATENTS

| | | |
|---|---|---|
| 280,173 | Germany | Nov. 6, 1914 |
| 153,780 | Switzerland | June 16, 1932 |